United States Patent [19]

Lee et al.

[11] Patent Number: 6,022,575
[45] Date of Patent: *Feb. 8, 2000

[54] METHOD TO PREVENT STARCH RETROGRADATION IN PASTA PRODUCTS

[75] Inventors: Yanien Lee, Manlius; Carleton George Merritt, Phoenix; Kurt Alpha, North Syracuse, all of N.Y.

[73] Assignee: Borden Foods Corporation, Columbus, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/907,097

[22] Filed: Aug. 6, 1997

[51] Int. Cl.$^7$ ....................................................... A23L 1/162
[52] U.S. Cl. .......................... 426/557; 426/451; 426/516
[58] Field of Search ..................................... 426/557, 451, 426/516

[56] References Cited

U.S. PATENT DOCUMENTS

| | | |
|---|---|---|
| 3,332,786 | 7/1967 | Edlin . |
| 3,426,125 | 2/1969 | Shigeta et al. . |
| 3,925,343 | 12/1975 | Hampton et al. . |
| 4,491,483 | 1/1985 | Dudacek et al. . |
| 4,517,215 | 5/1985 | Hus . |
| 4,529,609 | 7/1985 | Gaehring et al. . |
| 4,575,460 | 3/1986 | Alapi et al. . |
| 4,840,808 | 6/1989 | Lee et al. . |
| 4,965,082 | 10/1990 | Chawan et al. . |
| 5,264,238 | 11/1993 | Taga et al. . |
| 5,433,964 | 7/1995 | Norman et al. . |
| 5,545,410 | 8/1996 | Fox et al. . |
| 5,599,573 | 2/1997 | Barnes et al. . |
| 5,695,801 | 12/1997 | Oh ........................................... 426/557 |
| 5,759,607 | 6/1998 | Chawan et al. ........................ 426/557 |

OTHER PUBLICATIONS

Abstract—Gail D. Teague. Xanthan Gum And Alignates In Fresh And Dried Pasta For Texture Improvement. No date.

*Primary Examiner*—Lien Tran
*Attorney, Agent, or Firm*—Stevens, Davis, Miller & Mosher, L.L.P.

[57] ABSTRACT

A shaped and cooked pasta product is produced and coated with an edible hydrophillic additive which improves the retrogradation tendencies of the cooked and/or refrigerated pasta product. In a preferred embodiment salt is added to the alimentary paste used to prepare the pasta prior to extrusion. The presence of salt and the edible hydrophillic additive in the cooked pasta exhibit synergy in preventing retrogradation. These additives help maintain pasta texture after long periods of storage even after exposure to elevated temperatures and refrigeration. In a most preferred embodiment, the extruded product further includes propylene glycol alginate which further improves the anti-retrogradation properties of the cooked pasta. The cooked product coated with the edible hydrophillic additive can be further coated with an edible acid and an edible oil prior to packaging.

24 Claims, No Drawings

6,022,575

METHOD TO PREVENT STARCH RETROGRADATION IN PASTA PRODUCTS

FIELD OF THE INVENTION

This invention relates to a method of producing a pasta product. More particulary it relates to a method of making a pasta product that resists retrogradation.

BACKGROUND OF THE INVENTION

Retrogradation is a kinetic reaction/process in which water separates from the gelatinized starch and the gelatinized starch molecules progressively reassociate until a fine microcrystalline precipitate forms. This phenomenon is also known as synersis. The retrogradation process may be accelerated by cooling a hot or warm starch paste. The process of retrogradation takes place even in the solid state; for example, in the staling of cake or bread or cooked pasta. In fact, the texture of cooked pasta becomes grainy and mealy after refrigeration for more than 24 hours.

Retrogradation in a paste is determined by measuring the Brookfield viscosity of a paste immediately after pasting and then re-measuring the viscosity at room temperature after 3 and 24 hours. The less the viscosity change during the 3 hour and 24 hour intervals, the smaller is the degree of retrogradation.

Retrogradation in a dried pasta product is a subjective determination made by experienced panelists that sample pasta products and record their observations regarding the integrity of the texture of the product. Retrogradation can also be measured objectively with a differential scanning calorimeter.

Pasta is a starch containing product that is formed from an alimentary paste. Such pastes are generally made from coarse hard flours obtained from hard wheat such as the middlings of durum wheat. Durum wheat is often referred to as semolina flour or semolina. Semolina comprises a major portion of the flour in alimentary pastes because it is highly glutinous and provides a self-supporting pasta. A paste is formed by mixing the semolina with water and optionally additional ingredients prior to extruding the pasta into a shaped product. Shaped products made therefrom will substantially maintain their original form after subsequent processing such as cooking.

U.S. Pat. No. 4,491,483 to Dudacek et al discloses the preparation of a hot water dispersible granular starch product. The product includes the starch and at least 0.35% by weight of a surfactant containing a fatty acid moiety. Representative surfactants are glycerol monostearate, sodium stearoyl lactylate, D-glucose 3-stearate, methyl alpha-D-glucoside 6-stearate, sucrose monostearate, sorbitan tetrastearate, stearoyl-2-lactylate, sodium stearoyl fumarate etc. The product is identified as having a reduced tendency for retrogradation.

U.S. Pat. No. 4,840,808 to Lee (herein incorporated by reference) at al discloses a method for preserving color of vegetable pasta products. Color is enhanced by the addition of a cation such as magnesium, zinc, copper, calcium, and aluminum cations to the paste mixture. In addition, the patent discloses the presence of salt and glycerol monostearate to the paste mixture. Salt provides flavor. Glycerol monostearate functions as an emulsifier or lubricant or flow modifier, which reduces the viscosity of alimentary paste, making extrusion easier. It is reported that the use of glycerol monostearate will reduce the pressure within the extruder.

U.S. Pat. No. 4,529,609 (herein incorporated by reference) discloses the addition of a finely divided salt (NaCl) throughout a dough of wheat flour and water and drying the product to a moisture content of at least 15%. The salt is disclosed as allowing the use of other than semolina flour to prepare a pasta product. In addition, it interacts with the protein molecules in the dough at their polar sites which increases product flexibility. The salt is also reported to reduce the surface tension of the water which enables more complete hydration of the protein and starch granules.

U.S. Pat. No. 5,599,573 relates to preparing a cooked pasta product. The initial ingredient mix includes flour, water, acid and optionally propylene glycol alginate, spices, and glycerol monostearate. This product is prepared by mixing the flour with the acid and other ingredients. In addition, this product is produced by the cumbersome process of twice steaming acidified pasta with an intermediate water treatment. Glycerol monostearate is added to improve firmness, reduce stickiness and minimize absorption of water from a sauce component. No purpose is stated for the presence of PGA.

U.S. Pat. No. 3,332,786, issued Jul. 25, 1967 to Edlin, relates to the stabilization of starch against enzymatic degradation by the addition thereto of propylene glycol alginate. Edlin teaches the use of propylene glycol alginate to stabilize starch, including wheat starch, against degradation by amylase enzymes in an aqueous acid environment. Improvement of pasta texture is not taught and, in fact, the process of Edlin only produces a paste, not an extrudable pasta.

U.S. Pat. No. 4,517,215 relates to a process for preparing a vegetable pasta containing sodium or potassium alginate, starch and propylene glycol alginate.

U.S. Pat. No. 3,426,125, issued Aug. 19, 1947 to Steiner describes propylene glycol alginate.

SUMMARY OF THE INVENTION

The present invention relates to coating a cooked pasta product with an edible hydrophillic additive which improves the retrogradation tendencies of a cooked and/or refrigerated packaged pasta product. In a preferred embodiment salt is added to the alimentary paste used to prepare the pasta prior to extrusion. The presence of salt further improves the retrogradation tendencies of a cooked and/or refrigerated pasta product. In a most preferred embodiment, the extruded product includes propylene glycol alginate. The cooked product coated with the edible hydrophillic additive can be further coated with an edible acid and an edible oil prior to packaging.

DETAILED DESCRIPTION OF THE INVENTION

Pasta, for purposes of this invention includes products made with glutinous flour and wheat products such as durum wheat flour, semolina flour and farina flour, as well as buckwheat flour and other flours such as oat flour products, rice flour, and corn starch as well as any other cereal flour. Legumes can also be used as the source of starch flour. Thus, for example, pea flour, lima bean flour, navy bean flour, soybean flour and the like, or mixtures thereof can be used.

Hydrophillic additives which can be used in the claimed invention include but are not limited to the following: glycerol, sugar alcohol, starch hydrolysate, corn syrup, dextrose syrup, glycerol monostearate, sodium stearoyl lactylate, D-glucose 3-stearate, methyl alpha-D-glucoside 6-stearate, sucrose monostearate, sorbitan tetrastearate, stearoyl-2-lactylate, sodium stearoyl fumarate, polyoxyethylene stearate, stearyl monoglyceride citrate and propylene glycol alginate. For purposes of the invention any edible hydrophilic substance can be used that contains two or more hydroxyl groups.

The salt used in the invention is NaCl.

Salt and edible hydrophillic agents in cooked pasta products are synergistic in preventing retrogradation tendencies of a cooked and refrigerated pasta product. The presence of PGA further enhances the result of reduced retrogradation.

In the preparation of pasta and pasta-like products in the present invention, a dough or alimentary paste is prepared by combining at least an ungelatinized starch product such as, flour, and water. These ingredients are mixed together and the mixture can optionally include whole eggs, egg whites, and other additives. If the starch is wheat flour, the dough may also contain added protein, fiber, etc. The formed paste containing the above noted ingredients can include additives such as a sulfhydryl reducing agent and added vitamins, e.g. B-vitamins and trace elements. When these ingredients are uniformly mixed, the mixture is extruded. After it is extruded it is cooked, coated with at least one edible hydrophillic additive, such as glycerol, sugar alcohol, starch hydrolysate, corn syrup, dextrose syrup, glycerol monostearate, sodium stearoyl lactylate, D-glucose 3-stearate, methyl alpha-D-glucoside 6-stearate, sucrose monostearate, sorbitan tetrastearate, stearoyl-2-lactylate, sodium stearoyl fumarate, polyoxyethylene stearate, stearyl monoglyceride citrate, and propylene glycol alginate.

Preferably, prior to packaging the cooked product it is coated with an edible acid and preferably with an edible oil.

In a preferred embodiment of the invention NaCl is mixed along with water, and ungelatinized flour. According to the present invention, NaCl is added to the ungelatinized starch and water, to form a dough or alimentary paste. The addition of NaCl is made to the paste before the dough or alimentary paste is formed into a shape and preferably without the addition of an edible acid. Thus, in one embodiment of the present invention, an alimentary paste is prepared from ungelatinized semolina or durum wheat flour, water, and NaCl. A preferred embodiment combines semolina, 26–28% by weight of water based on the dry flour weight, and 0.2–2.5% NaCl, based on the dried flour weight.

In the preferred embodiment, the salt is first hydrated by mixing it with water. The hydrated salt is added to the ungelatinized starch or flour as a solid, or preferably as an aqueous solution.

The addition of salt to the pasta dough prior to extrusion plasticizes and complexes the gelatinized starch. The NaCl has an effect to soften/relax the gluten rigidity and consequently increase the elasticity.

In addition to added NaCl, polypropylene glycol alginate is optionally included in the alimentary paste. A preferred embodiment combines semolina, 26–28% by weight of water based on the dry flour weight, 0.1–2.0% by weight PGA, based on the dry flour weight and 0.2–2.5% NaCl, based on the dried flour weight. PGA is first hydrated by mixing 6 to 30 grams of PGA in 1000 grams of water. The hydrated PGA is added to the ungelatinized starch or flour as a solid, or preferably as an aqueous solution.

The presence of PGA in amounts of about 0.01–2% by weight of the cooked pasta product further retards retrogradation. In addition, at levels of 1% by weight in the pasta, PGA allows pasta to cook for periods of up to 18 minutes without degradation of flavor or texture. Levels of PGA of about 1% by weight in the pasta produce less water pickup for comparable cooking time, but higher levels of PGA will guard against overcooking. Such cooking tolerance is an unexpected and commercially significant advantage of the present invention. A preferred level of PGA in the dough is about 0.3%–0.5% by weight, preferably 0.5%. The alginate is believed to form a stable complex with starch which reduces solids loss on cooking. Also, the PGA prevents retrogradation of the starch under various conditions of storage.

The dough or alimentary paste containing the additives of the invention usually contains at least 28 to 30% by weight moisture prior to extrusion and it has a pH of greater than 5. The pH of the dough can be, for example, from about 6.0 to about 7.0. A preferred pH is about 6.5.

In this application, water or moisture content refers to total moisture, that is, inherent moisture, or moisture naturally present in the flour and other ingredients, as well as added water. The term "water" as used herein includes water in all physical states, i.e., steam, ice or liquid water, or mixtures thereof. The flour, water and any additives used may be mixed in any way conventional in the art, such as by mixing in a vertical cutter mixer (e.g. a Hobart Cutter/Planetary Mixer) for approximately 5 to 10 minutes, at which time the pasta dough is ready for extrusion in any of the conventional pasta shapes.

Shaped pasta is prepared from the paste by extrusion. Extrusion can be performed with any acceptable extruder. The alimentary paste is fed into the extruder wherein it may, optionally, be blended, in the case of a screw-type extruder, or further blended, if the feedstock was premixed before being fed into the extruder, and then forced by internal pressure through the channels or lands of a die face having a plurality of orifices forcing the paste to conform to a desired shape. The orifices of the die face are defined by the openings of through lands or channels in the die head. The shapes of the orifices on the die face determine the profile of the extruded pasta shape. Such shapes include spaghetti, fettuccini, linguine, rotini, elbows, spirals, shells, ziti, vermicelli, fusilli, tortellini, ravioli, manicotti, lasagna, rote, tortiglioni, or the like.

The alimentary paste, containing salt and optionally PGA, passes through the die due to internal pressure generated by a rotating screw or screws. Suitable screw speeds range from about 3.5 to 35 revolutions per minute (rpm), and preferably about 20 rpm to 23 rpm. A particularly optimal screw speed is about 25 rpm. In general, screw speeds in excess of about 30 rpm appear to result in a compromised texture and increased starch loss (during cooking) in the pasta product, whereas screw speeds of less than about 3.5 rpm render the extrusion process economically unfeasible.

The screw speed is chosen to result in an extrusion rate, for example, in the range of about 50 grams per minute (g/min) (6.6 lb/hr) to about 500 g/min (66 lb/hr) or greater, preferably about 175 g/min (23 lb/hr), based on a six-orifice die having approximately two inch deep or long lands.

The temperature of the paste may vary within the extruder because of the heat that is generated by friction at different points within the extruder. The temperature of the paste can also vary because it passes through different cooling or heating zones along the length of the extruder barrel. This may be desired where blending is intensified at separate locations in the extruder or components of the paste are added downstream of the feed hopper. However, the highest temperature experienced by the alimentary paste should be preferably below 120° F. (49° C.). The Phrase "standard conditions" as used herein, refers to those experienced in conventional paste extrusion operations where the combination of an extruder barrel temperature of about 120° F. (49° C.) or less, and an alimentary paste moisture content of about 30 weight percent are the norm. The pressures generated under such conditions are generally below 2000 psi in conventional commercial extruders. These pressure values will vary with the equipment utilized.

Where conventional equipment is utilized, preferred barrel temperatures fall in the range of about 70°–140° F. (21° C.–60° C.). Heat generated by friction within the extruder is often more than sufficient to provide the necessary operating temperatures. Alternatively, the extruder barrel may be heated by external water jackets or by an electrical resistance heater.

Vacuum pressure may or may not be used. If used, a vacuum of about 15.8 inches Hg(40 cm Hg) to about 28.7 inches Hg(60 cm Hg) preferably about 19.8 inches Hg(40 cm Hg) may be used.

The extruded pasta can, optionally, be dried at about from 100° F. to 205° F. at a controlled relative humidity (RH) of 60–95% from about 18 to 36 hours. After drying the pasta will preferably have a moisture content of about 12%–14% by weight.

The extruded dried or undried pasta can then be cooked by conventional methods of stove top boiling in excess water, stove top boiling in exact amount of water (i.e., no-drain cooking, wherein the pasta absorbs all the boiling water), or by microwave cooking.

This cooked pasta product is then coated with an edible hydrophillic additive or agent having two or hydroxyl groups. Representative hydrophillic additives, presented by way of example herein, include, but are not limited to glycerol, sugar alcohol, starch hydrolysate, corn syrup, dextrose syrup, glycerol monostearate, sodium stearoyl lactylate, D-glucose 3-stearate, methyl alpha-D-glucoside 6-stearate, sucrose monostearate, sorbitan tetrastearate, stearoyl-2-lactylate, sodium stearoyl fumarate, polyoxyethylene stearate, stearyl monoglyceride citrate, and propylene glycol alginate.

Thereafter, or simultaneously with the addition of the hydrophillic additive, an acid coating can be applied to the cooked pasta product. The acid coating extends the shelf life of the cooked product by reducing microbial activity during storage. Coating can be accomplished by placing the pasta in a coating drum as disclosed and claimed in U.S. Pat. No. 5,433,964, filed Jul. 9, 1993 by Norman et al., herein incorporated by reference. The interior of the drum, from one end to the other, contains pins. On rotation of the drum, pasta is separated and tumbled by the pins, and the pasta is exposed first to the hydrophillic additive or more preferably to a combination acid/hydrophillic additive spray composition, and preferably, thereafter the product is also exposed to an edible oil spray. On discharge from the drum, the pasta can be led to a proportioning or metering machine which can also be a part of a packaging machine. The packaging machine places the pasta in airtight vapor barrier packages, preferably sealed plastic pouches. The vapor barrier bags used to package the freshly prepared, cooked and coated pasta are preferably polyester film packages or trays of a thickness of 4.5 mils (0.143 mm). The sealed packages or trays are pasteurized in steam or hot water so that the product reaches a temperature of 195° F. (91° C.). Thus, the size of the package will determine the temperature of the pasteurizing medium and the time the package is exposed to the medium.

Edible acids which can be used in this invention are lactic acid, malic acid, acetic acid, fumaric acid, citric acid, tartaric acid, and phosphoric acids or a combination thereof. The acid should not impart to the pasta a taste which is not compatible with other components of the product. Preferably, lactic acid is applied to the cooked product, and it is preferable that the acid penetrate throughout the body of the pasta.

The amount of edible acid that is added should provide a cooked pasta product with a pH of less than 4.6, preferably within the range of 3.5 to 4.6 and most preferably within the range of 4.0–4.3.

The edible oil used to coat the pasta preferably has a melting point below about 104° F. (40° C.), preferably below about 95° F. (35° C.) to provide the desired function of preventing the fully cooked pasta from sticking and forming a solid mass. Preferably, below about 15% by weight of edible oil is used based on the weight of packaged contents. Preferred quantities of edible oil generally range from about 1% to about 8% by weight of the total package contents. Suitable edible oils include a vegetable oil, e.g., soybean oil, peanut oil, olive oil, sunflower oil, safflower oil, palm oil, coconut oil and the like. A particularly preferred separating oil solution is 3.0% oil containing 0.2762% lecithin. The pasta can also be sprayed with the hydrophillic additive, acid and then oil with conventional spraying equipment.

The pasta product, when packaged in a vapor barrier pouch, and pasturized will have good keeping qualities without refrigeration on the grocer's shelf because the coating acid is an antimicrobial agent. This product, which can be distributed as a freshly cooked pasta remains al dente and is ready to eat. A major advantage is that it requires only a warming step, thus, no further cooking is required, and it is ready to eat right from the grocer's shelf. It takes less than one-half the time of cooking the conventional dried pasta and has an improved al dente texture.

In all of the examples below, alimentary paste additives such as NaCl and PGA were dispersed in water and mixed with semolina to form dough. The dough was extruded through a spaghetti die using the pilot plant MAPA Impianti extruder and all edible coatings to the cooked pasta were applied in successive coatings of hydrophillic additive, acid and oil.

EXAMPLE 1

To 100 grams of semolina is added 26 grams of water and 2.6 grams of NaCl. These ingredients were mixed well in the mixing portion of the pasta extruder to prepare a paste. This dough was conveyed into the extrusion portion of the pasta extruder. The dough was cooked for pressed through a spaghetti die, cut into proper lengths, cooked for 6 minutes and coated with 0.32 grams of a food grade acid, 2.11 grams of a vegetable oil and 3.2 grams of glycerol.

EXAMPLE 2

The procedure of example 2 was repeated except 0.5 grams of PGA and only 2.1 grams of salt were added to the flour and water.

EXAMPLES 3–5

The procedure of example 2 was repeated except that no NaCl was included in the paste, PGA was present in amounts of 0.15 grams, the product was cooked for 25 minutes in excess boiling water and the products of Examples 3, 4 and 5 were only coated with 3.0 grams, 2.0 grams and 1.0 gram respectively of glycerol.

EXAMPLES 6–9

The procedure of examples 3–5 was repeated except the product was cooked in excess boiling water for 18 min.

COMPARATIVE EXAMPLE 10

An example of control formula (normal product) is as follows

| Dry Pasta | |
|---|---|
| Moisture | 11.0–12.5% |
| Semolina | 87–89% (Dry Basis) |

Cook 10 minutes, acidified, coated with vegetable oil (Yield: 1.0 pound of dry pasta will yield 2.0–2.3 pounds of cooked pasta), packaged and pasteurized

| Finished Products | |
|---|---|
| Cooked Pasta (Moisture 61–64% Semolina 36–39%) | 97–98.5% |
| Food Grade Acid | 0.30–0.32% (Lactic Acid 88) |
| Vegetable Oil | 1.0–2.5% |

EXAMPLE 11

An example of preferred formula is as follows:

| Dry Pasta | |
|---|---|
| Moisture | 11.0–12.5% |
| Salt | 1.75%–2.25% |
| Semolina | 84–88% (Dry Basis) |

Cook 10 minutes, acidified with an acid/glycerol solution, coated with vegetable oil (Yield- 1.0 pound of dry pasta will yield 2.0–2.3 pounds of cooked pasta), packaged and pasteurized.

| Finished Products | |
|---|---|
| Cooked Pasta (Moisture 60–63% Semolina 37–39% Salt 0.2–0.4%) | 94–96% |
| Food Grade Acid | 0.30–0.32% (Lactic Acid 88) |
| Vegetable Oil | 1.0–2.5% |
| Glycerol | 2.5–3.5% |

EXAMPLE 12

An example of further preferred formulas is as follows

| Dry Pasta | |
|---|---|
| Moisture | 11.0–12.5% |
| PGA | 0.1–0.75% |
| Salt | 1.75%–2.25% |
| Semolina | 84–88% (Dry Basis) |

Cook 18 minutes, acidified with acid/glycerol solution, coated with vegetable oil (Yield 1.0 pound of dry pasta will yield 2.75–3,25 pounds of cooked pasta), packaged and pasteurized.

| Finished Products | |
|---|---|
| Cooked Pasta (Moisture 66–69% Semolina 26–28% PGA 0.02–0.0600), Salt 0.2–0.4%) | 94–96% |
| Food Grade Acid | 0.30–0.32% (Lactic Acid 88) |
| Vegetable Oil | 1.0–2.5% |
| Glycerol | 2.5–3.5% |

Results (Average scores of 8 to 9 panelists, on the texture of a 9 point scale, 1=unacceptable to 9=acceptable/excellent)

| | Comparative Ex 10 | | Example 11 (Preferable) | | Example 1 2 (Most preferable) | |
|---|---|---|---|---|---|---|
| | 40° F. | 72° F. | 40° F. | 72° F. | 40° F. | 70° F. |
| Fresh (1 day) | 8.0 | 8.0 | 8.3 | 8.3 | 8.5 | 8.5 |
| 3 Months | 4.5 | 4.8 | 7.5 | 7.8 | 8.0 | 8.3 |
| 6 Months | 4.0 | 4.0 | 7.1 | 7.2 | 8.1 | 8.1 |
| 9 Months | — | — | 7.0 | 7.2 | 7.4 | 7.6 |
| 12 Months | — | — | 6.0 | 6.0 | 6.5 | 6.2 |

SUMMARY

The cooked acidified pasta made from regular product, without PGA (Propylene Glycol Alginate), salt, and glycerol, has a mealy texture (due to the starch retrogradation) after one week at 40 F. The additions of salt and glycerol exhibited the effect of retarding the starch retrogradation process. The addition of PGA, further enhanced this effect.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope of the invention.

Therefore, it is intended that the invention not be limited to the particular embodiment disclosed as the best mode contemplated for carrying out this invention, but the invention will include all embodiments and equivalents falling within the scope of the amended Claims.

What is claimed is:

1. A method for preventing starch retrogradation in cooked pasta products made from wheat flour comprising, mixing wheat flour, and water to form an alimentary paste;

extruding the alimentary paste to form a pasta product;

cooking the pasta product under conditions sufficient to form a cooked ready to eat pasta product; and contacting the cooked, ready to eat pasta product with an edible hydrophillic agent, wherein said hydrophillic agent is selected from the group consisting of glycerol, sugar alcohol, starch hydrolysate, corn syrup, dextrose syrup, glycerol monostearate, sodium stearoyl lactylate, D-glucose 3-stearate, methyl alpha-D-glucoside 6-stearate, sucrose monostearate, sorbitan tetrastearate, stearoyl-2-lactylate, sodium stearoyl fumarate, polyoxyethylene stearate, stearyl monoglyceride citrate and propylene glycol alginate to prevent starch retrogradation in the cooked pasta product.

2. The method of claim 1 further comprising drying the extruded pasta prior to cooking it.

3. The method of claim 2, wherein drying comprises subjecting the pasta to air temperatures of 100° F. to 200° F. at a relative humidity of 60–90%.

4. The method of claim 1 further comprising adding NaCl to the alimentary paste.

5. The method of claim 1 further comprising adding propylene glycol alginate to the alimentary paste.

6. The method of claim 1 further comprising coating the cooked pasta with an edible acid.

7. The method of claim 4 further comprising coating the cooked pasta with an edible acid.

8. The method of claim 1 further comprising coating the cooked pasta with an edible oil.

9. The method of claim 4 further comprising coating the cooked pasta with an edible oil.

10. The method of claim 1 further comprising coating the cooked pasta with an edible acid and then coating the cooked pasta with an edible oil.

11. The method of claim 5 wherein the propylene glycol alginate is first hydrated with water prior to adding it to the flour.

12. The method of claim 1 wherein the pasta product is cooked by boiling it in water.

13. The method of claim 1 wherein the pasta product is cooked by micro waving it.

14. A method for preparing shaped pieces of alimentary paste in a ready to eat form which comprises:

preparing a mixed feedstock comprising flour, propylene glycol alginate (PGA), salt and water to form an alimentary paste having a total moisture content at least about 30% by weight, wherein the amount of PGA is between 0.1 to 1.0% by weight based on a 10% moisture basis;

extruding said mixed feedstock to form shaped pieces;

cooking said pieces to form cooked, ready to eat shaped pieces and coating said ready to eat shaped pieces with an edible hydrophillic agent;

wherein said hydrophillic agent is selected from the group consisting of glycerol, sugar alcohol, starch hydrolysate, corn syrup, dextrose syrup, glycerol monostearate, sodium stearoyl lactylate, D-glucose 3-stearate, methyl alpha-D-glucoside 6-stearate, sucrose monostearate, sorbitan tetrastearate, stearoyl-2-lactylate, sodium stearoyl fumarate, polyoxyethylene stearate, stearyl monoglyceride citrate and propylene glycol alginate to prevent starch retrogradation in said cooked pieces;

packaging and sealing said ready to eat, shaped pieces in a container made of a vapor barrier material.

15. The method of claim 14 wherein said flour is selected from the group consisting of wheat flour, semolina flour and farina flour, buckwheat flour, oat flour, rice flour, corn starch, pea flour, lima bean flour, navy bean flour, soybean flour and mixtures thereof.

16. The method of claim 14 further comprising coating the cooked pieces with an edible acid.

17. The method of claim 14 further comprising coating the cooked pieces with an edible acid and then coating the cooked pasta with an edible oil.

18. The method of claim 14 further comprising drying the shaped pieces prior to cooking it.

19. The method of claim 18, wherein drying comprises subjecting the pieces to air temperatures of 100° F. to 205° F. at a relative humidity of 60–90%.

20. A cooked, ready to eat, shaped pasta product, resistant to starch retrogradation, comprising wheat flour, 0.1%–1.0% by weight propylene glycol alginate, 0.2–2.5% by weight of NaCl; and a coating of 2.0–4.0% of a hydrophillic agent selected from the group consisting of glycerol, sugar alcohol, starch hydrolysate, corn syrup, dextrose syrup, glycerol monostearate, sodium stearoyl lactylate, D-glucose 3-stearate, methyl alpha-D-glucoside 6-stearate, sucrose monostearate, sorbitan tetrastearate, stearoyl-2-lactylate, sodium stearoyl fumarate, polyoxyethylene stearate, stearyl monoglyceride citrate and propylene glycol alginate to impart resistance to starch retrogradation.

21. The cooked product of claim 20 further comprising a coating of an edible acid.

22. The cooked product of claim 21 further comprising a coating of an edible oil.

23. The cooked product of claim 21 wherein said pasta product comprises glycerol.

24. The cooked product of claim 20, wherein said hydrophillic agent is glycerol.

* * * * *